E. CHALLET.
AUTOMATIC MACHINE FOR CUTTING AND POLISHING A NUMBER OF JEWELS OR PRECIOUS STONES SIMULTANEOUSLY.
APPLICATION FILED NOV. 10, 1915.
1,240,313.
Patented Sept. 18, 1917.
4 SHEETS—SHEET 1.
Fig. 1ª
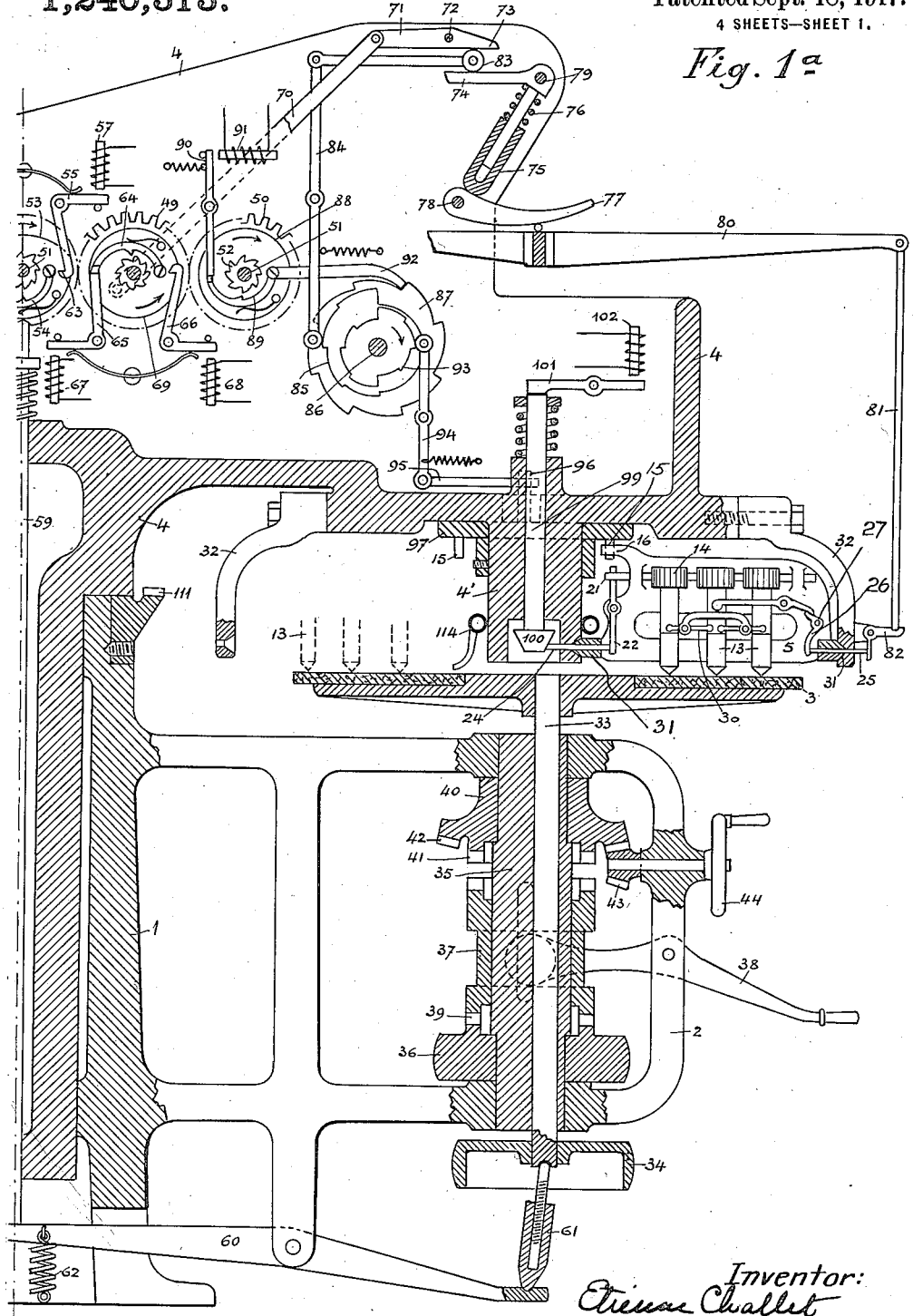
Inventor:
Etienne Challet
By Frank T. Wentworth
his Atty.

E. CHALLET.
AUTOMATIC MACHINE FOR CUTTING AND POLISHING A NUMBER OF JEWELS OR PRECIOUS STONES SIMULTANEOUSLY.
APPLICATION FILED NOV. 10, 1915.
1,240,313.
Patented Sept. 18, 1917.
4 SHEETS—SHEET 2.
Fig. 1ᵇ
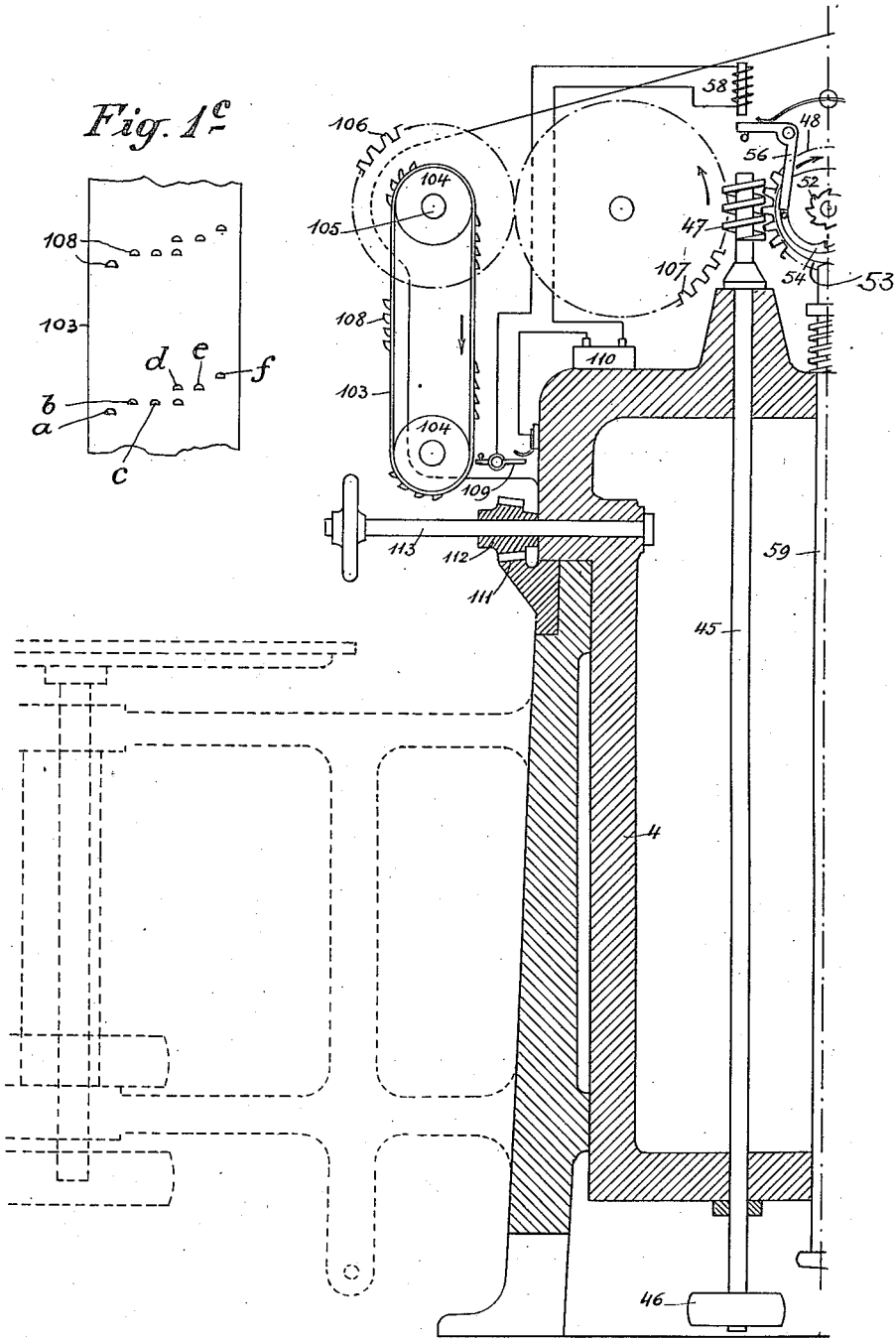
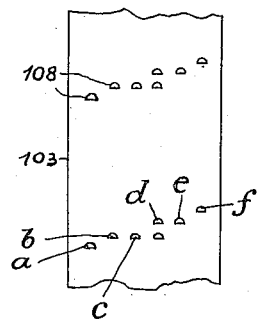
Fig. 1ᶜ
Etienne Challet Inventor:
By Frank T. Wentworth
his Atty.

E. CHALLET.
AUTOMATIC MACHINE FOR CUTTING AND POLISHING A NUMBER OF JEWELS OR PRECIOUS STONES SIMULTANEOUSLY.
APPLICATION FILED NOV. 10, 1915.

1,240,313.

Patented Sept. 18, 1917.
4 SHEETS—SHEET 3.

Etienne Challet   Inventor:
Frank P. Wentworth
By                 his Atty.

E. CHALLET.
AUTOMATIC MACHINE FOR CUTTING AND POLISHING A NUMBER OF JEWELS OR PRECIOUS STONES SIMULTANEOUSLY.
APPLICATION FILED NOV. 10, 1915.

1,240,313.

Patented Sept. 18, 1917.
4 SHEETS—SHEET 4.

Etienne Challet  Inventor:

By Frank P. Wentworth
his Atty.

UNITED STATES PATENT OFFICE.

ETIENNE CHALLET, OF GENEVA, SWITZERLAND, ASSIGNOR TO L. HELLER & SON, OF NEW YORK, N. Y.

AUTOMATIC MACHINE FOR CUTTING AND POLISHING A NUMBER OF JEWELS OR PRECIOUS STONES SIMULTANEOUSLY.

1,240,313.

Specification of Letters Patent.   Patented Sept. 18, 1917.

Application filed November 10, 1915.   Serial No. 60,695.

*To all whom it may concern:*

Be it known that I, ETIENNE CHALLET, citizen of Switzerland, residing at Geneva, Switzerland, have invented certain new and useful Improvements in Automatic Machines for Cutting and Polishing a Number of Jewels or Precious Stones Simultaneously; and I do hereby declare the following to be a full, clear, and exact description of the invention, such as will enable others skilled in the art to which it appertains to make and use the same, reference being had to the accompanying drawings, and to figures of reference marked thereon, which form a part of this specification.

The invention relates to an automatic machine serving to cut and polish the facets of jewels or precious stones; it permits of these operations being effected successively on a certain number of stones simultaneously.

In the accompanying drawing a form of machine is represented as an example for carrying the invention into effect.

Similar letters refer to similar parts throughout the several views.

Figure 1ᵃ is an elevation of the right hand side of the machine with certain parts shown in section and others represented only diagrammatically for the sake of clearness and Fig. 1ᵇ is a similar view of the left hand side of the machine and Fig. 1ᶜ is a detail view of a portion of the traveling templet actuating the circuit controlling mechanism.

Fig. 2 is a front view of the stone-carrying frame.

Fig. 3 a partial plan of Fig. 2.

Fig. 4 a section on line $x$—$y$ of Fig. 2, and

Fig. 5 a section on line $y$—$z$ of Fig. 2.

Figure 2:
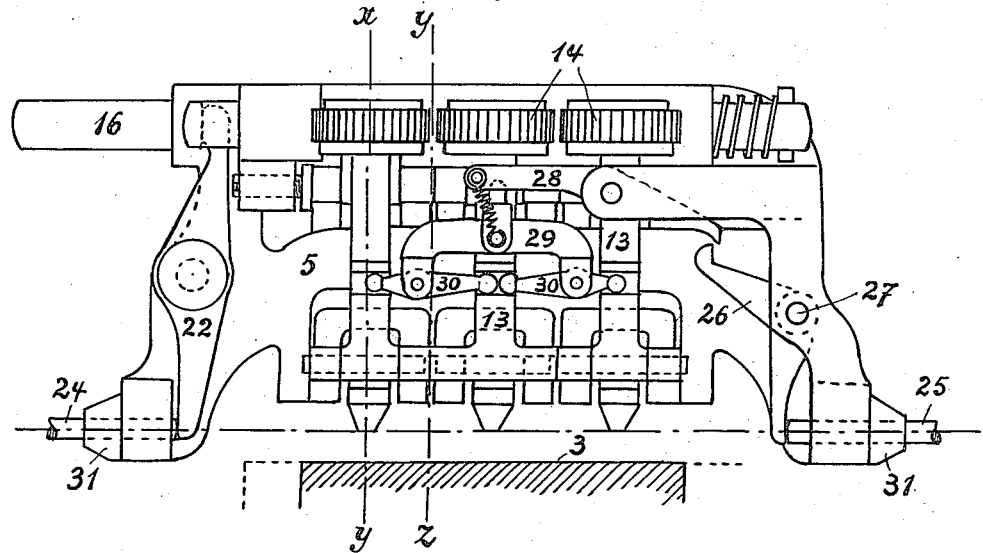
Figure 3:
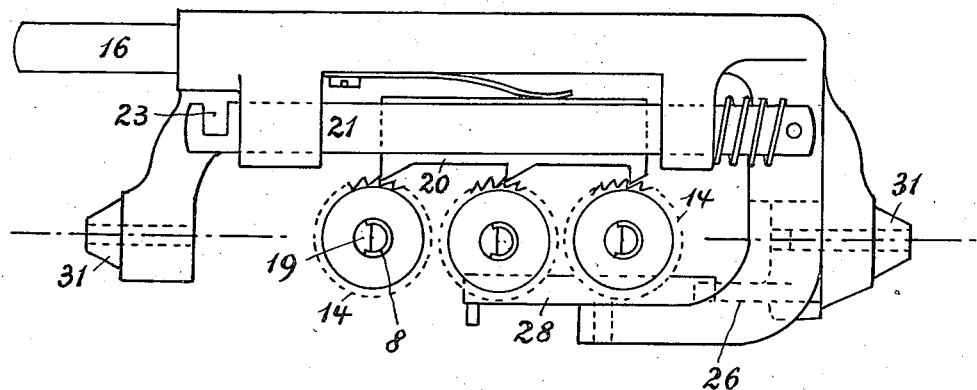
Figure 4:
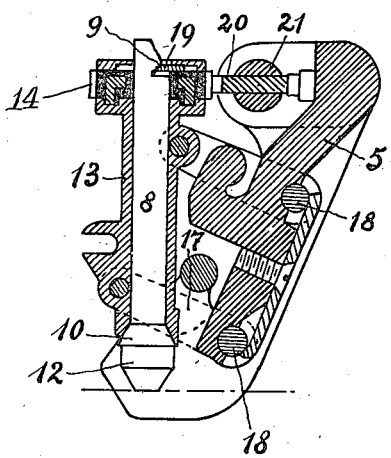
Figure 5:
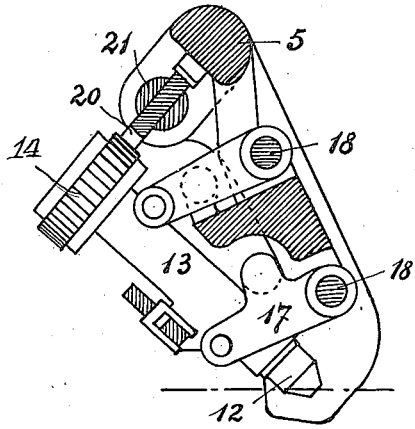
Figure 7:
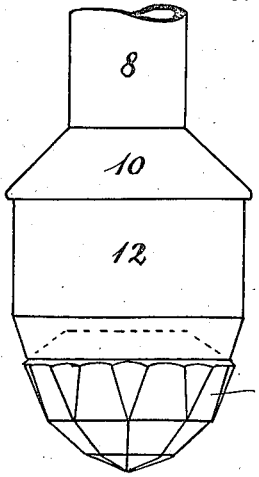
Fig. 7 shows a stone after cutting of the facets on its pavilion; it is still mounted on the stone-carrying spindle or dop which supports it during these operations.
Figure 6:
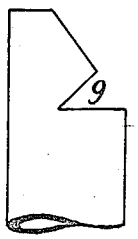
Fig. 6 shows a rough stone, intended to be cut on the machine.

The foot 1 of the machine carries a lateral frame 2 in which is mounted the grinding wheel 3 and a revolving support 4 on which are arranged the stone-carrying frames and the parts for insuring the automatic operation of the machine. The stone-carrying frames 5 are arranged radially around a hub 4¹ forming part of the revolving support 4, which enables these frames to be brought over the grinding wheel for operating on the stones and to be displaced for insertion and removal of the stone-carriers. These latter (Fig. 7) are composed of a tube 8, one end of which is provided with a notch 9 by which the stone-carriers are retained in the frame, and the other with a head 10 in which the stone 11 is set by means of a block of wax or cement 12. This setting of the stone in the extremity of the stone-carrier is preferably effected in a special machine or mold to insure the perfect centering of the stone which is indispensable for obtaining regular cutting. In order to enable the whole of the facets to be cut successively on the same grinding wheel, it is necessary to turn the stone-carrier through a given angle for the formation of each facet and to vary its inclination to the grinding wheel for each crown of facets. For this purpose the frames 5 of the stone-carriers (Figs. 2 to 5) can pivot around a horizontal axis 31 and the stone-carriers can rotate in sleeves 13 arranged normally to the axis 31. The rotation of the stone-carriers is produced by means of a ratchet toothed wheel 14 and the inclination of the frame 5 is controlled by a fork 15 acting on the fingers 16 of the frame. As seen in the drawing, each frame 5 comprises three sleeves 13 suspended independently of each other on arms 17 pivoted at 18 to the edge of the frame. This arrangement of the sleeves 13 on pivoted arms constitutes an elastic suspension for the stone-carriers which remains effective at all inclinations of the frame 5, which is obliged to describe an agle of about sixty degrees to permit of the cutting of all the facets of the pavilion of the stone shown cut in Fig. 7.

The toothed wheels 14 are free to turn on the sleeves 13. They each contain a spring 19 which engages the tooth 9 of the stone-carrier 8 when the latter is forced right home in the sleeve 13 and thus renders it fixed with the wheel 14. The simultaneous rotation of the three stone-carriers is effected by means of a spring pawl 20 common to them all and having three teeth, which is mounted in a spring rod 21 actuated by a lever 22, one extremity of which engages a recess 23 in the rod 21 and the other extremity of which is operated by the thrusts of a rod 24. At each stroke imparted to this rod, the pawl 20 recedes and on its return advances the three wheels 14 one tooth. This operation is repeated once, twice or thrice according to the extent of the angle corresponding to the facet to be cut.

The pressure on the sleeves 13 to apply the stones against the cutting wheel is produced by the rod 25 acting on a lever 26 pivoted at 27 and in its turn actuating a lever 28 solid with a stirrup 29 having toggles 30 which distribute the pressure equally to the three sleeves 13 (Figs. 1ª and 2.)

The rods 24 and 25 which respectively control the rotation of the stone-carriers and the pressure exerted thereon each traverse one of the trunnions 31 of the frame 5 so as not to impede its variations of inclination.

The frames of the stone-carriers are by means of their conical trunnions 31 pivoted in the hub 4¹ and in detachable arms 32. The number of frames thus arranged radially above the grinding wheel 3 varies according to the diameter of the wheel. In the machine shown there are twelve, which enables thirty-six stones to be operated upon at a time.

The wheel 3 is mounted upon a shaft 33 with driving pulleys 34 rotating at high speed. The shaft 33 is eccentric in a sleeve 35 having a pulley 36 rotating slowly and it can slide longitudinally in this sleeve, which allows the wheel 3 to be moved toward the stone-carriers for the operation and away therefrom to permit of the turning of the stone-carriers and the alteration of inclination of their frame. If the sleeve 35 turns, the wheel 3 is displaced at each rotation of the sleeve for a distance which is the double of the eccentricity of the shaft 33 in this sleeve. This displacement which imparts a planetary movement to the wheel is necessary to avoid the formation of ridge on the wheel; it corresponds to the separation of the stone-carriers, which enables an absolutely uniform wear of the latter to be secured.

On the sleeve 35 is keyed a sliding sleeve 37 toothed at both ends and controlled by a hand lever 38. The sliding sleeve is mounted between the pulley 36 which is toothed at 39 and a toothed wheel 40, having teeth 41, and teeth 42 constantly in gear with the pinion 43 of a hand wheel 44. The pulley 36 and the wheel 40 are both free on the sleeve 35 and consequently only actuate it when they are in gear with the sliding sleeve 37. If this latter is in gear with the pulley 36, the lateral displacement of the grinding wheel is effected regularly and if it gears with the wheel 40, such displacement is effected by hand, by operating the wheel 44, and if the sleeve 37 gears with neither the pulley 36, nor with the wheel 40, the rotation of the grinding wheel is concentric. This control by hand of the lateral displacement of the grinding wheel and the disconnection of the planetary movement are of importance, they enable diff rent trials to be made and particularly the finishing of the facets to be effected immediately after their polishing by arresting the lateral displacement of the grinding wheel either completely, or by limiting it by hand. The finishing cannot in fact be effected except by removing from the passage of the stones nearly all the grinding material situated on the grinding wheel. Now, this material is usually a paste composed of oil and diamond dust which is automatically pushed aside by the series of stones arranged in concentric circles if their travel over the grinding wheel is not continually altered.

The whole of the upward and downward movements of the grinding wheel 3, the inclination of the stone-carrier frames 5, the rotation of the stone-carriers and their pressure application are effected automatically and in the required order by cams operated at intervals by continuously rotating organs to which such cams are connected intermittently by means of coupling and uncoupling arrangements controlled by electro-magnets.

The said continuously rotating organs are operated by a shaft 45 passing vertically through the support 4 and carrying a pulley 46 and on top a worm 47; they comprise three toothed wheels 48, 49 and 50 each fixed on a shaft 51 carrying a ratchet wheel 52, and the first of which, 48, gears with the worm 47. On the shaft 51 of the wheel 48 is mounted a cam 53 which carries the pawl 54 which is spring actuated and pivoted to the cam 53. This pawl, under the impulse of its spring, tends to fall into engagement with the wheel 52, while the spring crank levers 55 and 56 controlled by electro-magnets 57 and 58 serve to hold said pawl out of engagement with its wheel 52. A spring rod 59 forced against the cam 53 transmits movement from the latter to a lever 60 on which rests a rod 61 of adjustable length which supports the shaft 33 of the grinding wheel 3 and which pivots on the lever 60 and the shaft 33 to allow of the planetary movement of this latter.

The weight of the shaft 33 and of its grinding wheel 3 is counterbalanced by the spring 62 of the lever 60 to diminish the strain on the cam 53, which by depressing the rod 59 produces the ascent of the wheel 3. This position of the wheel 3 maintained raised by the cam 53 in contact with the stones, is illustrated in Fig. 1.

To lower the grinding wheel, it is necessary for the electro-magnet 58 to be energized and to turn the lever 56 sufficiently to allow the pawl 54 to fall into engagement with the wheel 52. Then, the cam 53 becomes part of the wheel 52 which by means of said pawl carries it until the point of the latter abuts against the hook 63 of the lever 55. At this moment the pawl is released, the cam 53 arrested and the wheel 52 alone continues to advance. The cam has made a half rotation and the rod 59 bears on the part of least projection which corresponds to the position in which the wheel 3 is completely lowered. To subsequently produce a new ascent of the grinding wheel, it is the electro-magnet 57 which is energized so that it disengages the stop lever 55 of the pawl 54 and permits it to fall again into engagement with the toothed wheel 52. The cam 53 is then again carried forward and its rotation arrested only when the pawl 54 is raised by the lever 56 which in the meantime has been enabled to resume its stopping position and to deënergize the electro-magnet 58. Each time that the pawl 54 is abandoned by one of the levers 55 and 56, the cam 53 then makes a half revolution.

It is the same with the pawl 64 controlled by the levers 65 and 66 provided with electro-magnets 67 and 68 and actuating the disk 69 to which is pivoted a connecting rod 70. This rod operates the pressure lever 71 pivoted at 72 on the support 4 of the machine. On each half revolution of the plate 69 the lever 71 is operated in one direction, and then in the other. The point 73 of this lever acts on the arm 74 of a lever of V-form, the other arms of which has a point 75 bearing against an absorbing spring 76. This point is intended to travel over a lever of cam form 77 pivoted at 78 and the curvature of which is such that its displacement increases with the travel of the yielding point 75. The lever 74 is pivoted at 79 and the point 73 of the pressure lever acts on it through the intermediary of a roller 83 intended to be displaced and by this means forming a variable fulcrum on the lever 74 which allows of variation of the travel of lever 74 and consequently also of the lever 77 acting on a pressure device composed of a star 80 and of rods 81 acting through the intermediary of bell crank levers 82 on the pressure rods 25 passing through the trunnions of the frames of the stone-carriers. In the position shown in the drawing, the whole arrangement is at rest; in order to cause it to operate it is necessary for the plate 69 to make a half rotation and force the connecting rod 70 upward.

Then, the point 73 of the pressure lever is lowered and the lever 74 caused to describe an arc of a circle the extent of which varies with the position of the roller 83. If this roller is situated near the pivot 72 of the lever 71, the displacement is slight and when it is near the point 73 of said lever, the displacement is great and the yielding point 75 travels up to the end of the lever 77, the form of which is such that the pressure exerted is then at its maximum.

The position of the roller 83 is automatically controlled by means of a spring lever 84 bearing on a cam 85 in one with an axis 86 carrying a ratchet wheel 87 having eight teeth. This wheel is advanced one tooth at each revolution of a disk 88 with a pawl 89 operated like the pawls 54 and 64 by a toothed wheel 52. However, for this pawl 89, there is only one stopping lever 90 with electro-magnet 91 because for advancing the wheel 87 one tooth, the disk 88 of its ratchet 92 ought each time to make a complete rotation.

On the axis 86 is situated a second cam 93, which is also controlled by the rotation of the toothed wheel 87 and which serves to operate the spring lever 94 acting through the intermediary of the arm 95 and of the finger 96 on a ring 97 carrying the forks 15 which govern the inclination of the frames 5 of the stone-carriers. The finger 96 passes through an opening in the support 4 allowing of its displacement to turn the ring 97 successively through the small angles necessary to vary the inclination of all the frames 5.

With regard to the rotation of the stone-carriers this is effected by means of a spring rod 99 passing through the hub $4^1$ on which the frames 5 are pivoted. This rod carries a conical head 100 which, on each descent exerts a thrust on all the rods 24 of the frames 5 and thus actuates the levers 22 controlling the rotation of the stone-carriers. The rod 99 is operated by a lever 101 which is actuated in one direction by an electro-magnet 102.

The automatic control of the different electro-magnets is produced by a band 103 which passes over two drums 104 one of which is fixed on a shaft 105 carrying a toothed wheel 106 gearing with a large wheel 107 the continuous rotation of which is insured by the worm 47. This band bears projections 108 serving to act upon interrupters 109 of the circuits of electro-magnets 57, 58, 67, 68, 91 and 102 fed by a battery 110 rotating with the support 4.

The projections 108 are arranged and operate in the manner of the openings in a jacquard belt. As the band 103 advances these projections control the different operations in the required order. Thus, referring to Fig. $1^c$, the projections may be arranged so that $a$ produces the descent of the grinding wheel, $b$ the raising of the pressure of the stone-carriers, $c$ the modification in the inclination of their frames, $d$ their rotation, $e$ the return of the pressure, and $f$ the ascent of the grinding wheel. For the whole of these operations, the projections may be grouped so that they are affected almost simultaneously. The open spaces of the band between the groups of projections then correspond to the lapse of time during which the operation on the stones is carried on.

On the frame 1 two grinding wheels 3 might be arranged as shown in broken lines in Fig. 1ᵇ. One of the grinding wheels might then serve for the cutting and the other for the polishing and finishing of the stones and the stone-carriers be carried from one grinding wheel to the other. To facilitate this rotation of the support 4, a crown wheel 111 is provided on the frame 1 and a pinion 112 with hand wheel 113 on the support, so that by operating the hand wheel the pinion will run over the teeth of crown wheel 111 and carry the support along.

To diminish the crowding of the upper part of the machine it is preferable to mount the cam 53 and the disks 69 and 88 on the same shaft. The toothed wheels 49 and 50 will thus be suppressed, and which are necessary in the arrangement shown in Fig. 1, which was only adopted for the sake of clearness.

The electric control of the different operations might be replaced by a compressed air control and the stones might be cooled during the operation by a current of cold water or air conveyed by a jet tube 114 situated around the hub 4¹ supporting the frames of the stone-carriers.

Having thus described my invention what I claim and desire to secure by Letters Patent of the United States is:

1. A machine for cutting and polishing a number of jewel or precious stones simultaneously, embodying, therein a rotatable lapidary wheel, a stone carrying frame, pivotal supports for said frame whereby its angular relation to said wheel may be varied, a stone carrier, means revolubly supporting said carrier upon said frame, means whereby the revoluble support for the stone carrier is yieldingly thrust toward said lapidary wheel, and independently and automatically operative means whereby at predetermined intervals, said stone carrier and said lapidary wheel will be separated, said stone carrier will be turned in its support, said stone carrying frame will be moved about its pivotal support and said stone carrier and said lapidary wheel will be again brought into the operative relation to each other.

2. A machine for cutting and polishing a number of jewel or precious stones simultaneously, embodying, therein a rotatable lapidary wheel, means whereby said wheel may be caused to rotate only about its own axis or to simultaneously describe an orbit, a stone carrying frame, pivotal supports for said frame whereby its angular relation to said wheel may be varied, a stone carrier, means revolubly supporting said carrier upon said frame, means whereby the revoluble support for the stone carrier is yieldingly thrust toward said lapidary wheel, and independently and automatically operative means whereby at predetermined intervals, said stone carrier and said lapidary wheel will be separated, said stone carrier will be turned in its support, said stone carrying frame will be moved about its pivotal support and said stone carrier and said lapidary wheel will be again brought into the operative relation to each other.

3. An automatic machine for cutting and polishing a number of jewel or precious stones simultaneously, embodying, therein a revoluble sleeve, a shaft mounted eccentrically thereof, a lapidary wheel carried by said shaft, independently operative means whereby said shaft and said sleeve may be simultaneously rotated or said shaft alone may be rotated, a stone carrying frame, pivotal supports for said frame whereby its angular relation to said wheel may be varied, a stone carrier, means revolubly supporting said carrier upon said frame, means whereby the revoluble support for the stone carrier is yieldingly thrust toward said lapidary wheel, and independently and automatically operative means whereby at predetermined intervals, said stone carrier and said lapidary wheel will be separated, said stone carrier will be turned in its support, said stone carrying frame will be moved about its pivotal support and said stone carrier and said lapidary wheel will be again brought into the operative relation to each other.

4. A machine for cutting and polishing a number of jewel or precious stones simultaneously, embodying, therein a revoluble sleeve, a shaft mounted eccentrically thereof, a lapidary wheel carried by said shaft, independently operative means whereby said shaft and said sleeve may be simultaneously rotated or said shaft alone may be rotated, manually operative means whereby said sleeve may be rotated, a stone carrying frame, pivotal supports for said frame whereby its angular relation to said wheel may be varied, a stone carrier, means revolubly supporting said carrier upon said frame, means whereby the revoluble support for the stone carrier is yieldingly thrust toward said lapidary wheel, and independently and automatically operative means whereby at predetermined intervals, said stone carrier and said lapidary wheel will be separated, said stone carrier will be turned in its support, said stone carrying frame will be moved about its pivotal support and said stone carrier and said lapidary wheel will be again brought into the operative relation to each other.

5. A machine for cutting and polishing a number of jewel or precious stones simultaneously, embodying, therein a rotatable lapidary wheel, a stone carrying frame, pivotal supports for said frame whereby its angular relation to said wheel may be varied, a stone carrier, means revolubly supporting said carrier upon said frame, supporting means for said lapidary wheel whereby it may be moved toward or from said frame, means whereby the revoluble support for the stone carrier is yieldingly thrust toward said lapidary wheel and independently and automatically operative means whereby at predetermined intervals, said wheel will be moved away from said frame, said stone carrier will be turned in its support, said stone carrying frame will be moved about its pivotal support and said wheel will be moved toward said frame.

6. A machine for cutting and polishing a number of jewel or precious stones simultaneously, embodying, therein a rotatable lapidary wheel, a stone carrying frame, pivotal supports for said frame whereby its angular relation to said wheel may be varied, a stone carrier, means revolubly supporting said carrier upon said frame, supporting means for said lapidary wheel whereby it may be moved toward or from said frame, means whereby the revoluble support for the stone carrier is yieldingly thrust toward said lapidary wheel including therein means whereby the quantity of this thrust will be varied to accord with the change of the angular relation of the stone carrier to the wheel, and independently and automatically operative means whereby at predetermined intervals, said wheel will be moved away from said frame, said stone carrier will be turned in its support, said stone carrying frame will be moved about its pivotal support and said wheel will be moved toward said frame.

7. A machine for cutting and polishing a number of jewel or precious stones simultaneously, embodying, therein a rotatable lapidary wheel, a stone carrying frame, pivotal supports for said frame whereby its angular relation to said wheel may be varied, a plurality of stone carriers, means revolubly supporting said carriers upon said frame supports for said last named means whereby they are capable of independent rectilineal movement relatively to said frame, means whereby the revoluble supports for said stone carriers will be subject to an independent yielding thrust toward said lapidary wheel and independently and automatically operative means whereby at predetermined intervals, said stone carriers and said lapidary wheel will be separated, each of said stone carriers will be turned in its support, said stone carrying frame will be moved about its pivotal support and said stone carriers and said lapidary wheel will be again brought into the operative relation to each other.

In testimony that I claim the foregoing I have hereunto set my hand this sixteenth day of September, 1915.

ETIENNE CHALLET.

Witnesses:
   H. W. FRIEDLAND,
   R. SOLLBERGER.